(12) United States Patent
Miura et al.

(10) Patent No.: US 8,930,593 B2
(45) Date of Patent: *Jan. 6, 2015

(54) METHOD FOR SETTING PARAMETERS AND DETERMINING LATENCY IN A CHAINED DEVICE SYSTEM

(75) Inventors: Seiji Miura, Tokyo (JP); Roger Dwain Isaac, Campbell, CA (US)

(73) Assignee: Spansion LLC, Sunnyvale, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 12/276,061

(22) Filed: Nov. 21, 2008

(65) Prior Publication Data

US 2009/0138570 A1     May 28, 2009

Related U.S. Application Data

(60) Provisional application No. 61/004,412, filed on Nov. 26, 2007, provisional application No. 61/004,362, filed on Nov. 26, 2007, provisional application No. 61/004,434, filed on Nov. 26, 2007, provisional application No. 61/004,361, filed on Nov. 26, 2007.

(51) Int. Cl.
  *G06F 13/18*     (2006.01)
  *G06F 13/16*     (2006.01)

(52) U.S. Cl.
  CPC ........ *G06F 13/1673* (2013.01); *G06F 13/1684* (2013.01)
  USPC ................... 710/43; 710/38; 710/39; 710/40; 710/52

(58) Field of Classification Search
  CPC combination set(s) only.
  See application file for complete search history.

(56) References Cited

U.S. PATENT DOCUMENTS

| | | | |
|---|---|---|---|
| 6,658,509 B1 * | 12/2003 | Bonella et al. ................ | 710/100 |
| 7,120,743 B2 * | 10/2006 | Meyer et al. .................. | 711/118 |
| 7,512,762 B2 * | 3/2009 | Gower et al. ................. | 711/167 |
| 7,533,218 B2 * | 5/2009 | Cypher ......................... | 711/115 |
| 2004/0024948 A1 | 2/2004 | Winkler et al. | |
| 2004/0139286 A1 | 7/2004 | Lin et al. | |
| 2005/0086441 A1 | 4/2005 | Meyer et al. | |
| 2005/0149774 A1 | 7/2005 | Jeddeloh et al. | |
| 2005/0172084 A1 * | 8/2005 | Jeddeloh ....................... | 711/154 |
| 2005/0177677 A1 | 8/2005 | Jeddeloh | |
| 2006/0095701 A1 | 5/2006 | Gower et al. | |
| 2006/0179262 A1 | 8/2006 | Brittain et al. | |
| 2007/0005922 A1 * | 1/2007 | Swaminathan et al. ...... | 711/167 |
| 2009/0043934 A1 * | 2/2009 | Bjerregaard .................. | 710/244 |

FOREIGN PATENT DOCUMENTS

| | | |
|---|---|---|
| JP | 2007-526559 A | 9/2007 |
| WO | WO2007-002546 A2 | 4/2007 |
| WO | WO2007-060250 A1 | 5/2007 |

* cited by examiner

*Primary Examiner* — Ilwoo Park

(57) ABSTRACT

A storage system and method for setting parameters and determining latency in a chained device system. Storage nodes store information and the storage nodes are organized in a daisy chained network. At least one of one of the storage nodes includes an upstream communication buffer. Flow of information to the storage nodes is based upon constraints of the communication buffer within the storage nodes. In one embodiment, communication between the master controller and the plurality storage nodes has a determined maximum latency.

18 Claims, 3 Drawing Sheets

300

```
┌─────────────────────────────────────┐
│ Inserting a new request to a vector │
│       comprising                    │
│   the requests to be forwarded      │
│              310                    │
└─────────────────────────────────────┘
                 │
                 ▼
┌─────────────────────────────────────┐
│ Rearranging the requests to be      │
│ forwarded and                       │
│ the new request based on            │
│ corresponding latency               │
│ of the new request and              │
│ corresponding latencies             │
│    of the requests within the vector│
│              320                    │
└─────────────────────────────────────┘
```

FIGURE 3

METHOD FOR SETTING PARAMETERS AND DETERMINING LATENCY IN A CHAINED DEVICE SYSTEM

RELATED APPLICATIONS

This application claims the benefit and priority to a provisional application Ser. No. 61/004,412, inventors Miura et al., entitled "A METHOD FOR SETTING PARAMETERS AND DETERMINING LATENCY IN A CHAINED DEVICE SYSTEM" that was filed on Nov. 26, 2007 and is hereby incorporated by reference in its entirety.

Moreover, this application claims priority to and the benefit of the provisional patent application, Ser. No. 61/004,362, inventors Miura et al., entitled "A SYSTEM AND METHOD FOR ACCESSING MEMORY," with filing date Nov. 26, 2007, and hereby incorporated by reference in its entirety.

Furthermore, this application claims the benefit of and priority to co-pending provisional application Ser. No. 61/004,434, inventors Miura et al., entitled "A STORAGE SYSTEM AND METHOD" that was filed on Nov. 26, 2007 and is hereby incorporated by reference in its entirety.

This application also claims benefit of and priority to co-pending provisional application Ser. No. 61/004,361, inventors Miura et al., entitled "SYSTEMS AND METHODS FOR READ DATA BUFFERING" that was filed on Nov. 26, 2007 and is hereby incorporated by reference in its entirety.

This application is related to and incorporates by reference in its entirety patent application Ser. No. 12/276,010, issued as a patent with U.S. Pat. No. 8,732,360, inventors, Miura et al., entitled "A SYSTEM AND METHOD FOR ACCESSING MEMORY," that was filed on Nov. 21, 2008. This application is further related to and incorporates by reference in its entirety patent application Ser. No. 12/276,143, issued as a patent with U.S. Pat. No. 8,874,810, inventors, Miura et al., entitled "A STORAGE SYSTEM AND METHOD," that was filed on Nov. 21, 2008. Moreover, this application is related to and incorporates by reference in its entirety patent application Ser. No. 12/276,116, issued as a patent with U.S. Pat. No. 8,601,181, inventors, Miura et al., entitled "SYSTEMS AND METHODS FOR READ DATA BUFFERING," that was filed on Nov. 21, 2008.

TECHNICAL FIELD

Embodiments of the present invention relate to the field of memory components. More particularly, embodiments of the present invention relate to a method for setting parameters and determining latency in a chained device system.

BACKGROUND ART

Electronic systems and circuits have made a significant contribution toward the advancement of modern society and are utilized in a number of applications to achieve advantageous results. Electronic technologies such as digital computers, calculators, audio devices, video equipment, and telephone systems have facilitated increased productivity and reduced costs in analyzing and communicating data, ideas and trends in most areas of business, science, education and entertainment. Frequently, the electronic systems designed to provide these results include memories. However, accessing memory resources in a fast and efficient manner can involve complicated protocols.

Numerous electronic devices include processors that operate by executing software comprising a series of instructions for manipulating data in the performance of useful tasks. The instructions and associated data are typically stored in a memory. Memories usually consist of a location for storing information and a unique indicator or address. The utility a device provides often depends upon the speed and efficiency at which instructions are executed. The ability to access a memory and transfer information quickly and conveniently usually has a significant impact on information processing latency. The configuration of a memory usually affects the speed at which memory locations are accessed.

Traditional attempts at memory control are often very convoluted and complex. Conventional daisy chain systems often involve latencies that can become very large due to large buffer sizes and scheduling amongst the various nodes within the daisy chain. It is often problematic for controllers and/or central processors to determine latency for read requests without complex scheduling algorithms and artificial limitations of the system. Traditional approaches often lead to long average latencies, very complex control mechanisms, larger buffer sizes, or a combination of such problematic concerns.

SUMMARY

Accordingly, a need has arisen to determine the exact latency of a request without complex scheduling algorithm while avoiding artificial limitations of the system. Moreover, a need has arisen to determine the exact latency without using long average latencies and large buffer sizes. Furthermore, a need has arisen to determine the dynamic minimal and maximal latency by using the available bandwidth, the number of outstanding requests, priority and minimal roundtrip latency, to name a few. Thus, a need has arisen to determine the minimal, maximal and exact latency for a request in a daisy chained device. It will become apparent to those skilled in the art after reading the detailed description of the present invention that the embodiments of the present invention satisfy the above mentioned needs.

In one embodiment of the present invention, a storage system includes a plurality of storage nodes for storing information. The storage system may also include a master controller, e.g., a CPU, for controlling the flow of information to the plurality of storage nodes.

It is appreciated that the plurality of storage nodes include at least more than one node that may be organized in a chained network, e.g., a daisy chain network. In one embodiment, at least one storage node includes an upstream communication buffer, e.g., internal and external buffer. In accordance with one embodiment, the internal buffer of a first storage node is used for storing information pertaining to the first storage node whereas the external buffer is used for storing information pertaining to a storage node other than the first storage node. It is appreciated that other storage nodes may similarly have external and internal buffers for storing information accordingly. In one example, the upstream communication buffer temporarily stores responses from an internal memory core while waiting for responses from other storage nodes further down the daisy chain to be forwarded upstream.

In one embodiment of the present invention, the master controller controls the flow of information to the storage nodes based on one or more constraints of the upstream communication buffer, e.g., internal and external buffers, of the storage nodes. The master controller controls the flow of information such that communication between the master controller and the storage nodes have a determined maximum latency. According to one embodiment, the constraint of the upstream communication buffer is based on providing priority to responses to a storage node, e.g., memory node, that are further down the daisy chain stream.

According to one embodiment, the master controller determines the individual latency for each storage node based on a vector of outstanding responses in the system, minimum latencies for each of the storage nodes, a burst length of the request, a clock frequency, a width of the bus coupling the master controller to the storage nodes and a memory node count of the number of the storage nodes in the system, to name a few. It is appreciated that the minimum latency may be determined as the roundtrip time of a request to be sent and a response to be received from a particular storage node when there are no other pending requests.

As a result, the maximum latency of any request, e.g., read request, may be defined using the same equation and the minimum latency of a given storage node in the system. Thus, the master controller, e.g., CPU, may build requests to be sent to storage nodes based on the apriori knowledge of latency for each node in order to reduce response time in the daisy chain system.

BRIEF DESCRIPTION OF THE DRAWINGS

FIG. 3 shows an exemplary flow diagram for rearranging requests prior to forwarding the request in accordance with one embodiment of the present invention.

DETAILED DESCRIPTION

Figure 1:
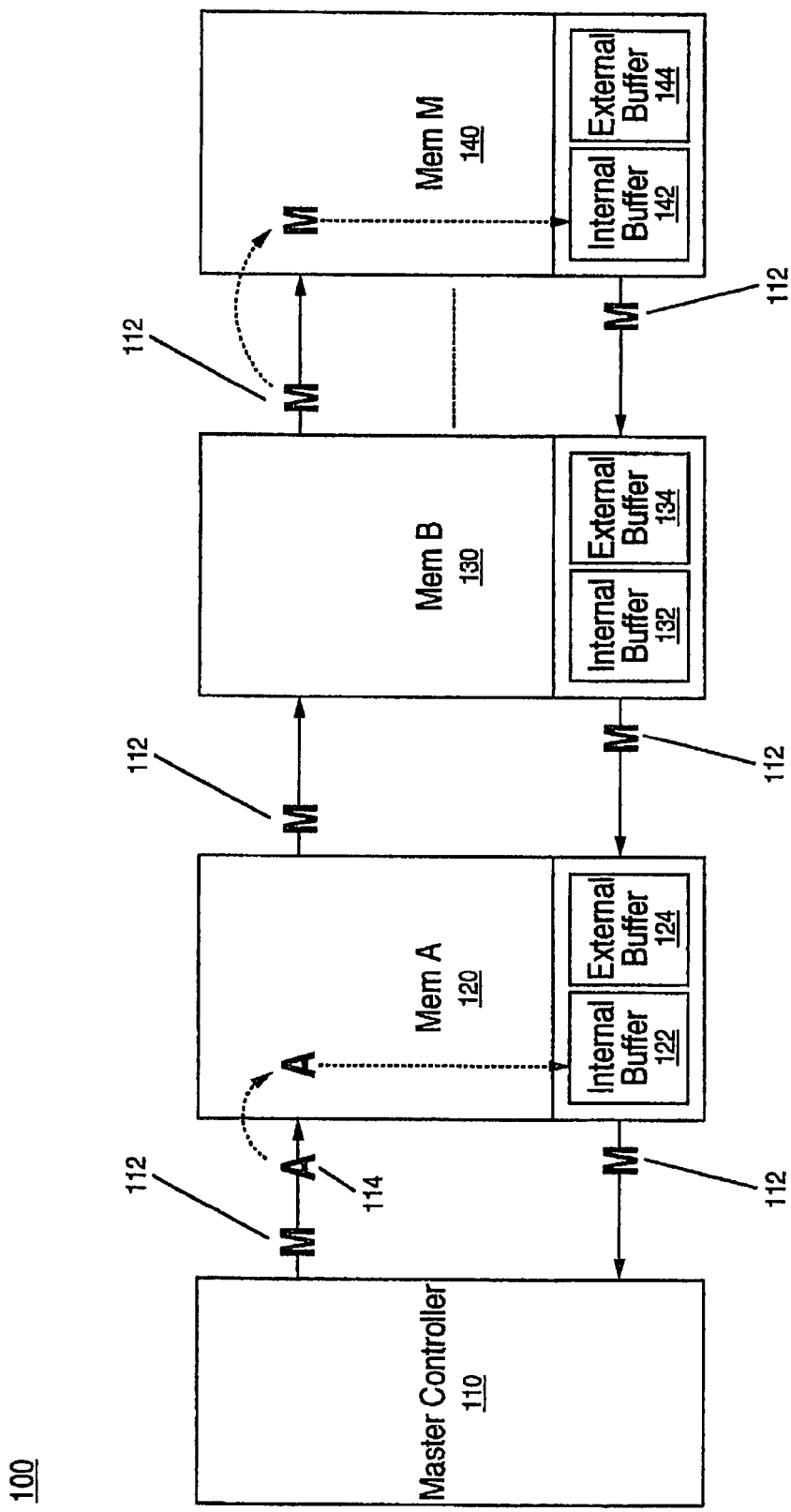
FIG. 1 shows an exemplary system in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternative, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from following discussions, it is appreciated that throughout the present invention, discussions utilizing terms such as "processing" or "creating" or "transferring" or "executing" or "determining" or "instructing" or "issuing" or "clearing" or "accessing" or "aggregating" or "obtaining" or "selecting" or "initiating" or "receiving" or "sending" or "analyzing" or "generating" or "constructing" or "outputting" or "collecting" or "configuring" or "outputting" or "storing" or "sending" or "receiving" or "identifying" or "using" or "rendering" or "translating" or "forwarding" or "organizing" or "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A Method for Setting Parameters and Determining Latency in a Chained Device System Referring now to FIG. 1, an exemplary system 100 in accordance with one embodiment of the present invention is shown. The system 100 in one embodiment comprises a master controller 110 and a plurality of memory components commonly referred to as storage nodes in the instant application. The master controller 110 may be a CPU that may control the flow of information. In this embodiment, a first storage node 120, e.g., memory A, is coupled to a second storage node 130, e.g., memory B, which is coupled to other storage nodes including the third storage node 140, e.g., memory M. It is appreciated that in this embodiment, the storage nodes are coupled in a daisy chain structure or configuration. However, it is appreciated that non-daisy structures or configurations may be coupled to the daisy structure.

The master controller 110 may control the flow of information and may send a plurality of requests to storage nodes. Requests may include a read request, a write request, etc. In this exemplary embodiment, since the storage nodes are coupled in a daisy chain structure, the request from the master controller 110 is sent down the daisy chain. For example, a request M 112 message destined for the third storage node 140, may be sent from the master controller 110 to the first storage node 120 where the first storage node 120 passes the request M 112 to the second storage node 130, which in turn passes that request to the destined storage node 140. As a result, a request from the master controller 110 travels down the daisy chain structure. Similarly, the master controller 110 may send a request A 114 message destined for the first storage node 120 down the daisy chain structure. In this exemplary embodiment, the request message A 114 is received by the first storage node 120. In the exemplary embodiment shown, each request response is labeled based on the destined storage node. For example, the request/response for the first storage node 120, e.g., memory A, is denoted as A. Similarly, the request/response for the third storage node 140, e.g., memory M, is denoted as M.

In response to the received request, the corresponding storage node responds back to the master controller 110 via the daisy chain structure. For example, the third storage node 140 may send the response M 112 to the second storage node 130 which in turn passes the response to the first storage node 120 and ultimately back to the master controller 110. Similarly, the first storage node 120 may respond by sending the response back to the master controller 110 (not shown).

In case of a collision between responses from various storage nodes, priority is given to a response packet from a storage node furthest from the master controller 110. In other words, storage nodes further down the stream in the daisy chain structure have priority over storage nodes closer to the master microcontroller 110. For example, the response packet from the third storage node 140, e.g., memory M, is given priority over all other storage nodes. Similarly, the response packet from the second storage node 130, e.g., Memory B, is given priority over the response packet from the first storage node 120, e.g., Memory A.

Since a response packet from storage nodes further from the master controller 110 are given priority over response packets from storage nodes closer to the master controller 110, each storage node is equipped with at least one upstream buffer. The upstream buffer may store data responses from the storage node itself or store data responses from another storage node that is further from the master controller 110. For example, the upstream buffer in the first storage node 120, e.g., Memory A, may comprise an internal buffer 122 and an external buffer 124. The internal buffer 122 is operable to store responses from the first storage node 120 and the external buffer 124 is operable to store response packets from storage nodes further from the master controller 110, e.g., the second storage node 130 and the third storage node 140.

Similarly, the upstream buffer in the second storage node 130, e.g., Memory B, may comprise an internal buffer 132 and an external buffer 134. The internal buffer 132 is operable to store responses from the second storage node 130 and the external buffer 134 is operable to store response packets from storage nodes further from the master controller 110, e.g., the third storage node 140. It is appreciated that other storage nodes, e.g., the third storage node 140, may similarly comprise an upstream buffer that comprises an internal buffer 142 and an external buffer 144 that operate in similar manner described above.

The following example illustrates the priority concept in case of a collision between two responses from different storage nodes. In one example, the request A 114 is received by the first storage node 120. The first storage node 120 similarly receives the response M 112 from the third storage node 140. As a result, the first storage node 120 has to choose which response first gets sent to the master controller 110. Since the third storage node 140 is further from the master controller 110 in comparison to the first storage node 120, the second storage node 120 sends the response M 112 from the third storage node 140 to the master controller 110. While the first storage node 120 sends the response M 112 message to the master controller 110, the first storage node 120 temporarily stores the response to the message A 114 in the internal buffer 122 such that the response can be sent subsequent to the response M 112 message. In contrast, if the first storage node 120 receives the response M 112 message while transmitting the response A 114 to the master controller 110, the response M 112 message is temporarily stored in the external buffer 124 for later transmission to the master controller 110. It is appreciated that other storage nodes behave substantially similar to the first storage node 120.

According to one embodiment of the present invention, the amount of time that a response waits in an upstream buffer may be represented in the following equation:

$$N/(t_{CK}*W*2) \quad (1)$$

where N is the length of the robust request in bytes. The clock period is represented as $t_{CK}$ and the size of the bus is represented as W bytes. N/W is also known as the burst length (BL) of the response. As a result, equation (1) may be represented as:

$$BL/2*1/t_{CK} \quad (2).$$

The maximum latency time for a request from the furthest node, e.g., the third storage node 140, can be represented in the following equation:

$$\text{Max Lat (Max Node)} = \text{Min Lat (Max Node)} + (\text{Max Node}-1)*BL/2*1/t_{CK} \quad (3)$$

where Min Lat is the minimum latency for a request for a given storage node. For example, Min Lat (A) is the minimum roundtrip latency in the system when there are no requests pending. Similarly, Min Lat (B) is the minimum roundtrip latency in the system when there are no requests pending. Max Node is the node furthest from the master controller 110. In this exemplary embodiment, the Max Node is the third storage node 140.

It is appreciated that since priority is given to a storage node furthest from the master controller 110 when there is a collision between responses from various storage nodes, the requests to an inner storage node waits until the request to the further nodes are completed. As a result, the maximum latency of a node closer to the master controller 110 is also related to the maximum latency of the furthest node, e.g., Max Node which is the third storage node 140. Thus, the maximum latency of a node closer to the master controller 110 is also related to Max Lat (Max Node). The maximum latency for a given storage node, e.g., the second storage node 130, is the sum of minimum latency of the given node, e.g., the latency for the second storage node 130, and the maximum latency between the given node, e.g., the second storage node 130, and the maximum latency storage node, e.g., the third storage node 140, in addition to any additional buffer delays between the given node, e.g., the second storage node 130, and the master controller 110. In other words, the maximum latency for a given storage node, e.g., x, may be represented in the following equation:

$$\text{Max Lat }(x) = \text{Min Lat }(x) + \text{Min Lat (Max Node)} + (\text{Max Node}-x)*(BL/2*1/t_{CK}) - \text{Min Lat }(x) + (N-1)(BL/2*1/t_{CK}) \quad (4)$$

which can be reduced to:

$$\text{Max Lat }(x) = \text{Min Lat (Max Node)} + (\text{Max Node}-1)*(BL/2*1/t_{CK}) \quad (5).$$

As a result, the maximum latency for any request may be defined using the same equation (5). Thus, the maximum latency for any given storage node may be defined using the minimum latency of any request for a given node in the system.

Accordingly, the master controller 110 may control the flow of information to storage nodes based on one or more constraints, e.g., latency constraint, of the upstream communication buffer, e.g., internal and external buffers, of the storage nodes. The master controller controls the flow of information such that communication between the master controller and the storage nodes have a determined maximum latency. According to one embodiment, the constraint of the upstream communication buffer is based on providing priority to responses to a storage node, e.g., memory node, that are further down the daisy chain stream.

According to one embodiment of the present invention, the exact latency may be determined by the master controller 110. For example, the master controller 110 may build a vector of response data of request storage node names and use the vector to calculate the individual latency of a given request. It is appreciated that the determination of an individual latency is based on the apriori knowledge of the daisy chain structure. In one example, the built vector may be represented as follows:

0B0BBBBCCCACCCCCCCCCCCCCC where the most recent request is the request B on the left side of the vector. The master controller 110 expects the oldest response to request C to arrive at the master controller 110 next, which is the C to the right side of the vector. It is appreciated that "0" represents when there are no data to be returned on a given cycle. It is further appreciated that the response A in the middle may be younger than the requests to its left due to differing latencies between storage nodes C and A.

In one exemplary embodiment, when the master controller 110 inserts a request, e.g., an A request, the vector may be represented as follows:

00AB0BBBBCCCACCCCCCCCCCCCCC or
000BABBBBCCCACCCCCCCCCCCCCC.

It is appreciated that since A request has a shorter latency in comparison to a B request, the A request may be inserted at a minimum latency slot in the vector to reduce the latency in the system. It is further appreciated that insertion of A request in this exemplary embodiment depends on the speed of the link, the minimum latency of A and the minimum latency for a B request.

In another exemplary embodiment, when the master controller 110 inserts a B request the vector may be represented as 0B0B0BBBBCCCACCCCCCCCCCCCCC. When the master controller 110 inserts a C request the vector may be represented as C00B0BBBBCCCACCCCCCCCCCCCCC.

It is appreciated that since the latency time for a C request is longer, the bus may be idle for extra time as represented by "0" shown. In one example, when a B request is to be inserted after a C request, the vector may become 0CB00B0BBBBCCCACCCCCCCCCCCCCC. It is appreciated that B is inserted ahead of C because the latency of B request is shorter in comparison to the latency of C request. By inserting the request with a shorter latency ahead of the request with longer latency, the latency of the system is reduced.

In the above example, if an A request is to be inserted next, then the vector may be represented as 00CBA0B0BBBBCCCACCCCCCCCCCCCCC. It is appreciated that A is inserted ahead of B and C request because the latency of an A request is shorter in comparison to the latency of a B or a C request. As a result, the exact latency may be determined in the daisy chain structure.

As a result, knowledge of the maximum latency, minimum latency and the exact latency by the master controller 110 enables the master controller 110 to rearrange, organize and control the flow of information to and from storage nodes. Controlling the flow information may reduce the latency in the system and speed up the process for a request based on latency of the buffers and other constraints.

Figure 2:
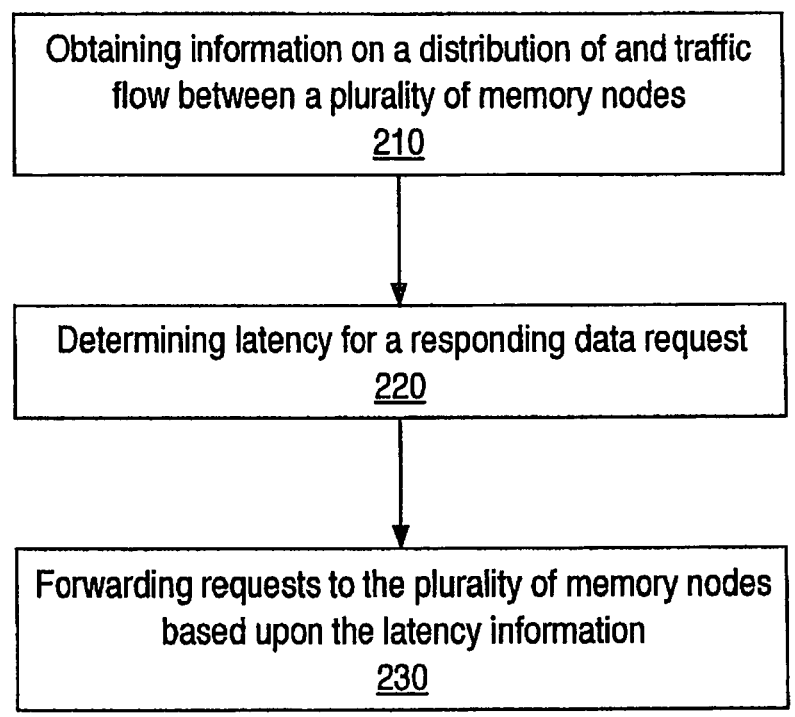
FIG. 2 shows an exemplary storage flow diagram in accordance with one embodiment of the present invention.

Referring now to FIG. 2, an exemplary storage flow diagram 200 in accordance with one embodiment of the present invention is shown. At step 210, information regarding the distribution of and traffic flow between memory nodes and a master controller may be obtained. For example, the information may include the number of memory components in a daisy chain structure. Similarly, the information may include the length of the robust request in bytes, the period of the clock and the size of the bus in bytes, to name a few. In one example, the information on the distribution may indicate that the storage nodes are arranged in a daisy chain structure and/or that a storage nodes further from the master controller 110 are given priority over storage nodes closer to the master controller 110 when there is a collision between the responses in various storage nodes.

At step 220, the latency for a responding data request may be determined. For example, it may be determined whether the request is for the first storage node 120, the second storage node 130 or the third storage node 140. Once the destined storage node or memory component is determined, the latency for the response to the data request may be determined. In one example, the latency may be determined using equations (1) through (5) described and presented above. Accordingly, the latency may be based upon a maximal latency and/or minimal latency. As described and presented above, minimal latency may be determined by the roundtrip time of a request to reach a storage node and for the storage node to respond and send the respond to the master controller 110 when there are no other requests pending.

It is appreciated that in one embodiment, a vector of requests may be formed in order to determine the exact latency as described and presented above. It is further appreciated that in one embodiment, the latency may be based on latency for a request under constraints. It is appreciated that constraints may include latency of storage nodes, priority of various storage nodes and maximum latency based on the priority of various storage nodes, to name a few.

Referring now to FIG. 3, an exemplary flow diagram 300 for rearranging requests prior to forwarding the request in accordance with one embodiment of the present invention is shown. At step 310, prior to the forwarding the requests, a new request is inserted to a vector that comprises requests to be forwarded to storage nodes. It is appreciated that the vector of requests is built by the master controller 110 as discussed and presented above. Using the built vector, the exact latency may be determined.

At step 320, the requests within the vector that now includes the new inserted request are rearranged. It is appreciated that in one embodiment, the rearrangement is based on the corresponding latency of the new request and corresponding latencies of the requests within the vector. For example, as presented and discussed above when an A request is to be inserted, it may be inserted ahead of a B request within the vector because the latency of an A request is shorter in comparison to the latency of a B request. Similarly, other new requests may be inserted and the request entries of the vector may be rearranged based on the latency of the new request and the entries within the vector. Rearranging the requests may therefore reduce the latency within the system, thereby improving the speed of the system.

The latency of each storage node is known apriori by the master controller. Moreover, the latency of storage nodes are governed by the same relationship, thereby eliminating the need for complex scheduling algorithm while avoiding artificial limitations on the system. Furthermore, the latency is determined using given resources, e.g., buffer size, bandwidth, the number of outstanding requests, priority and minimal roundtrip latency, to name a few. Thus, the need for large buffer size is eliminated since the requests may be rearranged to reduce latency and reduce the need to store large information in buffer.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A storage system comprising:
   a plurality of storage nodes for storing information wherein said plurality of storage nodes are organized in a chained network and at least one of said plurality of storage nodes includes an upstream communication buffer; and
   a master controller for controlling flow to said plurality of storage nodes based upon constraints of said upstream communication buffer within said plurality of storage nodes, wherein a communication of a given burst length between said master controller and any of said plurality of storage nodes has a same estimated maximum possible latency, and wherein a maximum possible latency for communication to any storage node is estimated based on:
   a minimum latency of a most distant storage node,
   a quantity of storage nodes in the plurality of storage nodes, and
   a burst length of the communication and a clock period,
   wherein said information is independent of an actual latency in a recent read operation, and wherein a minimum possible latency for any storage node other than the most distant storage node is less than the maximum possible latency,
   wherein said upstream communication buffer is configured to store a response from a first storage node of the plurality of storage nodes in response to a collision with a response from any downstream storage node of the plurality of storage nodes.

2. A storage system of Claim 1 wherein information on the distribution of said plurality of storage node indicates said plurality of storage nodes are organized in a chained network and priority is given to responses from said storage nodes which are downstream.

3. A storage system of claim 1 wherein a size of at least one of said upstream buffers is established by the length of a burst request in N.

4. A storage system of claim 1 wherein a maximum time that a request from a furthest of said plurality of storage nodes is defined by the relationship:

$$maxLat(MaxNode)=minLat(MaxNode)+(MaxNode-1)*(BL/2*1/tCK)$$

where maxLat(MaxNode) is the maximum possible latency of the last node in the chain, minLat(MaxNode) is the minimum latency of the last node in the chain, BL is the burst length of the response and tCK is the clock period.

5. A storage system of claim 4 wherein a minimal latency is determined by the roundtrip time of a request to be sent and a response to be received from a particular one of said plurality of storage nodes as if there were no other requests pending.

6. A storage system of claim 1 wherein said upstream buffer temporarily stores responses from an internal memory core while waiting for responses from other devices downstream to be forwarded upstream.

7. A storage system of claim 1 wherein said master controller estimates an individual latency of a request based upon:
   a vector of outstanding responses in said system;
   minimum latencies for each of said plurality of storage nodes;
   a burst length of the request;
   a clock frequency;
   a width of a bus coupling said mater controller and said plurality of storage nodes; and
   a storage node count of the number of said plurality of storage nodes in said system.

8. A storage method comprising:
   obtaining information on a distribution of and traffic flow between a plurality of storage nodes, wherein at least one of said plurality of storage nodes includes an upstream communication buffer;
   estimating latency for a responding data request; and
   forwarding requests to said plurality of storage nodes based upon said latency information, and wherein a same maximum possible latency for a communication of a given burst length to any of said plurality of storage nodes is estimated based on information of:
   a minimum latency of a most distant storage node,
   a quantity of storage nodes in the plurality of storage nodes, and
   a burst length of the communication and a clock period,
   wherein said information is independent of an actual latency in a recent read operation, and wherein a minimum possible latency for any storage node other than the most distant storage node is less than the maximum possible latency,
   wherein said upstream communication buffer stores a response from a first storage node of the plurality of storage nodes in response to a collision with a response from any downstream storage node of the plurality of storage nodes.

9. A storage method of claim 8 wherein said information on said distribution indicates said plurality of storage nodes are organized in a chain configuration and priority is given to responses from said memory nodes which are downstream.

10. A storage method of claim 8 wherein said latency includes a dynamic minimal and maximal latency.

11. A storage method of claim 8 wherein said latency includes a latency for a request under constraints.

12. A storage method of claim 8 wherein a minimal latency is determined by the roundtrip time of a request to be sent and a response to be received from a particular one of said plurality of storage nodes as if there were no other requests pending.

13. A storage method of claim 8 wherein a maximal latency is estimated by the time that a request and response from a furthest of said plurality of storage nodes takes to return and is defined by the relationship:

$$maxLat(MaxNode)=minLat(MaxNode)+(MaxNode-1)*(BL/2*1/tCK)$$

where maxLat(MaxNode) is the maximum possible latency of the last node in the chain, minLat(MaxNode) is the minimum latency of the last node in the chain, BL is the burst length of the response and tCK is the clock period.

14. A storage method of claim 8 further comprising:
   prior to said forwarding said requests, inserting a new request in a vector comprising said requests to be forwarded; and
   rearranging said requests to be forwarded and said new request based on corresponding latency of said new request and corresponding latencies of said requests within said vector.

15. A storage method of claim 8, wherein individual latency of a request is estimated based upon:
- a vector of outstanding responses in response to said forwarding requests;
- minimum latencies for each of said plurality of storage nodes;
- a burst length of the request;
- a clock frequency;
- a width of a bus; and
- a memory node count of the number of said plurality of storage nodes.

16. A storage system comprising:
- a first storage node of a plurality of storage nodes for storing information, wherein said first storage node includes an upstream communication buffer; and
- a master controller for controlling flow to said first storage node based upon constraints of said communication buffer, wherein a communication of a given burst length between said master controller and any of said plurality of storage nodes has a same estimated maximum possible latency, wherein a response coming from farther downstream of said first storage node is given priority, and wherein the maximum possible latency for any communication to any storage node is estimated based upon:
    - a minimum latency of a most distant storage node,
    - a quantity of storage nodes in the storage system, and
    - a burst length of the communication and a clock period,
- wherein said information is independent of an actual latency in a recent read operation, and wherein a minimum possible latency for any storage node other than the most distant storage node is less than the maximum possible latency,
- wherein said upstream communication buffer is configured to store a response from said first storage node of the plurality of storage nodes in response to a collision with a response from any downstream storage node of the plurality of storage nodes.

17. A storage system of claim 16 wherein said first storage node and a second storage node are organized in a chain configuration.

18. A storage system of claim 16, wherein the master controller inserts a new request and rearranges requests within a vector request based on the corresponding latency of said new request and corresponding latencies of said requests within said vector request.

* * * * *